(12) United States Patent
Arnold

(10) Patent No.: US 8,056,711 B2
(45) Date of Patent: Nov. 15, 2011

(54) DISPLAY FOR BICYCLE HANDLEBAR GRIPS

(75) Inventor: Franc Arnold, Koblenz (DE)

(73) Assignee: RTI Sports Vertrieb von Sportatikeln GmbH (DE)

( * ) Notice: Subject to any disclaimer, the term of this patent is extended or adjusted under 35 U.S.C. 154(b) by 1056 days.

(21) Appl. No.: 11/159,012

(22) Filed: Jun. 22, 2005

(65) Prior Publication Data
US 2006/0053955 A1    Mar. 16, 2006

(30) Foreign Application Priority Data
Jun. 24, 2004   (DE) .................... 20 2004 009 963 U

(51) Int. Cl.
*B65D 85/00* (2006.01)
*B65D 85/08* (2006.01)

(52) U.S. Cl. ...................... 206/315.1; 206/446; 206/493

(58) Field of Classification Search ............... 206/315.1, 206/349, 446, 477, 493, 495; 248/220.21, 248/220.41
See application file for complete search history.

(56) References Cited

U.S. PATENT DOCUMENTS

| | | | | | |
|---|---|---|---|---|---|
| 5,328,033 | A | * | 7/1994 | Ptaschinski | 206/586 |
| 5,632,387 | A | * | 5/1997 | Johnson | 211/59.1 |
| 5,711,421 | A | * | 1/1998 | Guo | 206/223 |
| 6,161,693 | A | * | 12/2000 | Findle et al. | 206/349 |
| 6,935,516 | B2 | * | 8/2005 | Chiang | 211/70.6 |
| 6,986,538 | B1 | * | 1/2006 | Ecker | 294/158 |
| 6,988,739 | B2 | * | 1/2006 | Guderzo et al. | 280/260 |
| 7,070,049 | B2 | * | 7/2006 | Lee et al. | 206/349 |

* cited by examiner

*Primary Examiner* — Jila Mohandesi
*Assistant Examiner* — Sharon M Prange
(74) *Attorney, Agent, or Firm* — Ohlandt, Greeley, Ruggiero & Perle, LLP

(57) ABSTRACT

A display for a bicycle handlebar grip comprises a base element to which a receiving element is connected. The rod-shaped receiving element serves to be able to slip a bicycle handlebar thereon.

18 Claims, 2 Drawing Sheets

DISPLAY FOR BICYCLE HANDLEBAR GRIPS

FIELD OF THE INVENTION

The invention relates to a display for handlebar grips.

DISCUSSION OF THE BACKGROUND ART

Products such as bicycle handlebar grips are presented in sales rooms by means of displays. Typically, displays include a display element consisting of, e.g., thick cardboard or the like to which the products are connected. The products can be arranged, for example, in a transparent packaging body that is connected to the display element by glueing in particular. The display is to present the goods in a sales-promoting manner.

It is an object of the invention to provide a display for bicycle handlebar grips by means of which the bicycle handlebar grips are presented in a manner appealing to the customer.

SUMMARY OF THE INVENTION

The display for bicycle handlebar grips according to the invention comprises a base element to which a rod-shaped receiving element is connected. According to the invention, a bicycle handlebar grip is adapted to be slipped onto the rod-shaped receiving element so that the rod-shaped receiving element substantially resembles to a handlebar end. According to the invention, it is thereby possible to grip the bicycle handlebar grip slipped onto the receiving element. Thus, the customer is able to test how the grip feels and how the grip feels in the hand, e.g., for its ergonomic shaping.

Thus, the display for bicycle handlebar grips according to the invention has the advantage that a customer is not only able to look at but also try the product. This is particularly of decisive importance for the purchase in case of ergonomically designed bicycle handlebar grips with, e.g., special grip surfaces and grip shapes. Because of the display according to the invention, in contrast to conventional displays in which the bicycle handlebar grips are arranged, it is no longer required to present a single bicycle handlebar grip to the customer for the purpose of testing. This is particularly advantageous when there is a plurality of different bicycle handlebar grips since the customer is able to easily test different bicycle handlebar grips when the display according to the invention is used.

Preferably, the receiving element for the bicycle handlebar grip is releasably connected with the base element. This, e.g., can be effected by a snap-in, clamping or screw connection. Further, the receiving element may have a stripping protection at the end facing away from the base element. The stripping protection guarantees that the bicycle handlebar grip cannot be stripped off the rod-shaped receiving element and stolen by a custumer in the shop without any greater trouble. The stripping element can be configured as a head-shaped projection. The stripping element is particularly configured as a circular disk having a larger diameter than the rod-shaped, particularly cylindrical, receiving element. This results in that the bicycle handlebar grip has to be slipped onto the receiving element from that side thereof which faces the base element and that the receiving element is connected with the base element after the bicycle handlebar grip is slipped onto the receiving element.

In a particularly preferred embodiment, the base element is further connected with a display element for presenting information. Particularly the name of the product, product information, price quotations etc. can be printed on the display element. The display element, for example, is a plane element of a thicker cardboard or plastic material of, e.g., 2-3 mm.

Preferably, the display element has a grip opening pointing toward the receiving element so that it is well possible to test the bicycle handlebar grip by gripping. Preferably, the grip opening substantially has the width of the grip. In the direction of the receiving element or when the bicycle handlebar grip is mounted, the grip opening is open toward the bicycle handlebar grip. Preferably, the grip opening is hemiellipsoidal or half-oval.

The display element or the base element further has a suspending element, e.g., a suspending opening, connected thereto. By means of the suspending element, the display can be arranged at a display stand of a sales board which, e.g., is provided with an appropriate hook and the like.

The base element which may also have a rod-shaped configuration comprises a hollow space for receiving assembly instructions, a guarantee etc., which preferably extends in longitudinal direction. Preferably, the opening is closed by a cover.

Since it suffices that one bicycle handlebar grip can be tested by the customer, the second bicycle handlebar grip is preferably arranged in a packaging body connected with the display element. The packaging body may be a transparent plastic body preferably connected with a surface of the display element by being glued thereon.

BRIEF DESCRIPTION OF THE DRAWINGS

Hereinafter, the invention is explained in detail with respect to a preferred embodiment with reference to the accompanying drawings.

In the Figures.

DETAILED DESCRIPTION OF THE PREFERRED EMBODIMENT

Figure 1:
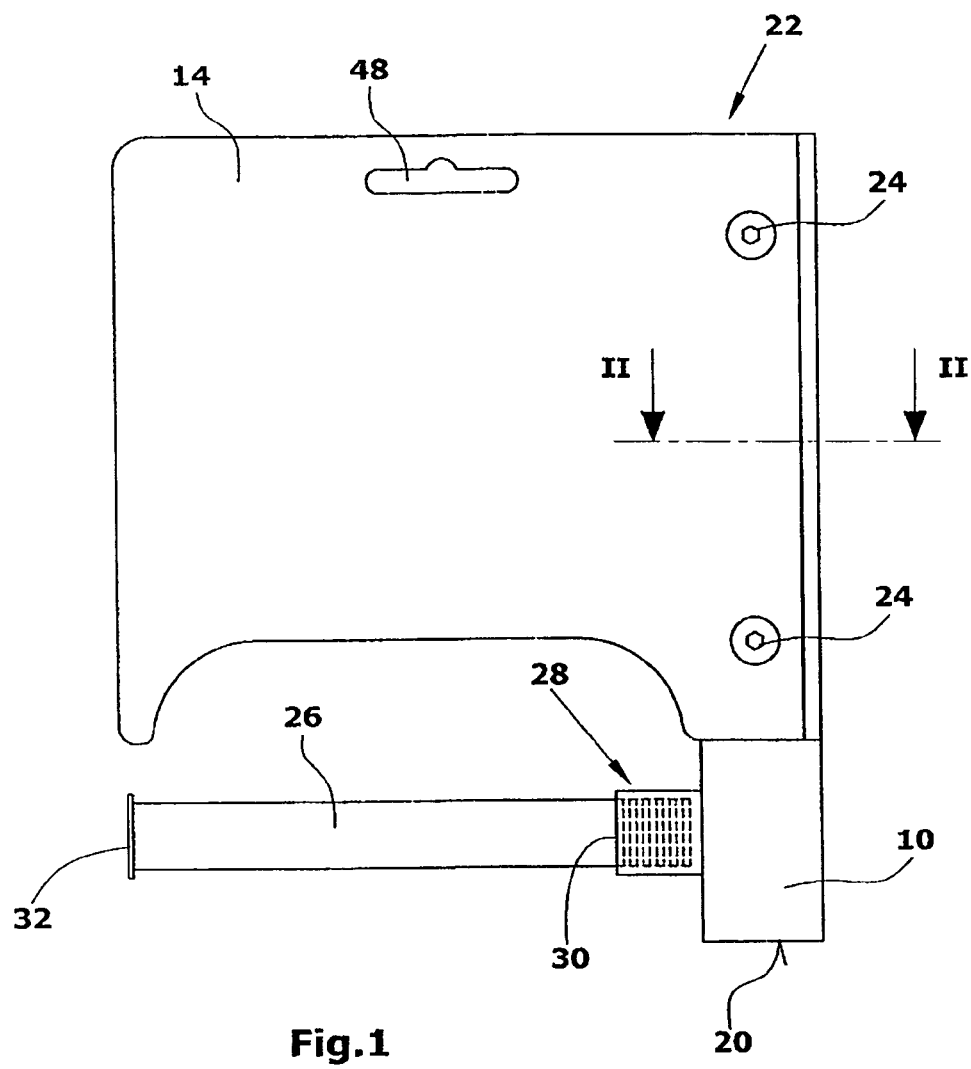
FIG. 1 shows a plan view of the display according to the invention without bicycle handlebar grips.
Figure 2:
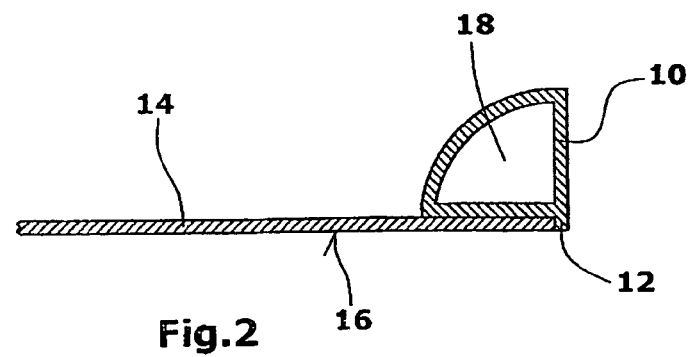
FIG. 2 shows a schematic sectional view along the line II-II in FIG. 1.

The display comprises a rod-shaped base element 10 which, e.g., consists of plastic material. Substantially over its entire length, the base element 10 has the cross-section illustrated in FIG. 2, which substantially corresponds to a quarter circle. The base element 10 has a stop 12. The latter serves to fix the position of a display element 14. The stop 12 preferably has a thickness corresponding to the thickness of the display element 14 so that a surface 16 of the display is flush with the top surface of the stop 12.

Further, the base element 10 comprises a hollow space 18 extending in longitudinal direction and being closed at a lower side 20 and at an upper side 22. One of the two closing elements may be configured as a cover so that the base element can be opened. This serves for being able to arrange, e.g., assembly instructions and/or a guarantee and the like in the hollow space 18.

The base element 10 has the display element 14 firmly connected thereto via fastening elements such as screws 24. The display element 14 preferably is a plane element consisting of cardboard of a thickness of, e.g., 2-4 mm. On the surface 16 of the display element 14 or, if necessary, on the opposite rear side as well, information can be presented, particularly printed.

Figure 3:
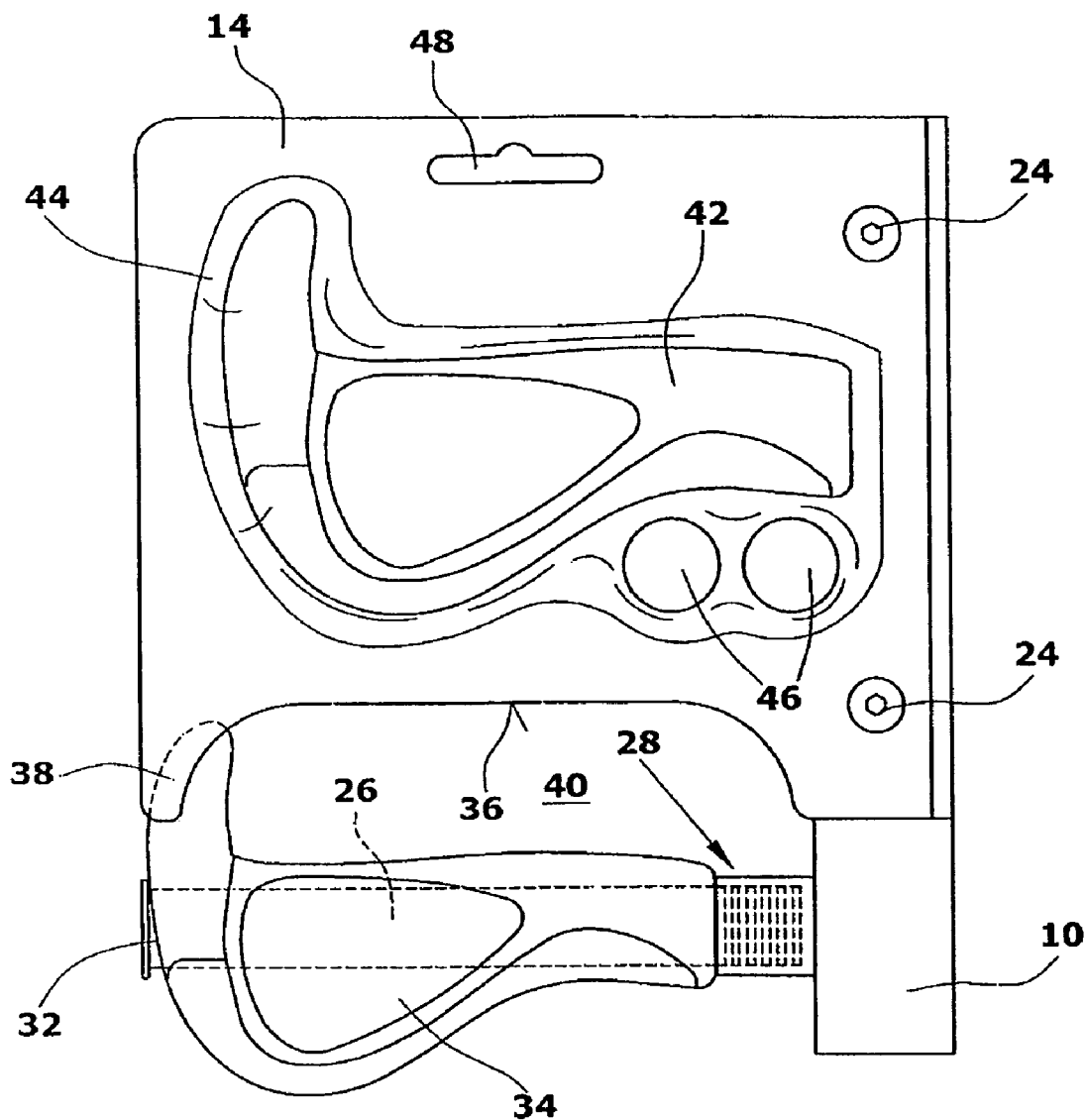
FIG. 3 shows a schematic top view of the display with bicycle handlebar grips.

A receiving element 26 is arranged below the display element. The receiving element 26 has a rod-shaped, particularly cylindrical configuration. In the illustrated embodiment, the receiving element 26 is connected with a likewise cylindrical projection piece 30 of the base element via a screw connection 28. At the end of the receiving element 26 facing away from the base element, a stripping protection 32 is provided. The stripping protection 32 may be a circular disk with a diameter that is larger than that of the cylindrical receiving element 26. The stripping protection avoids that the bicycle handlebar grip 34 (FIG. 3) can already be stripped off the receiving element 26 and stolen in the sales rooms.

In the direction of the side pointing to the bicycle handlebar grip 34, the display element 14 comprises a grip opening 36 so that the bicycle handlebar grip 34 can be easily tested or taken in the hand by a customer. The grip opening 36 is configured such that it is shaped in correspondence with half an ellipse or half an oval so that a projection 38 is formed. Thereby, an opening 40 is created which animates the customer to touch the bicycle handlebar grip 34.

A second bicycle handlebar grip 42 is arranged in a preferably transparent packaging body 44. The packaging body 44 particularly consisting of a thin plastic material surrounds the bicycle handlebar grip 42 as well as locking elements 46 for locking the handlebar ends when the bicycle handlebar grips are mounted. In the direction of the display element 14, the packaging body is open and connected therewith by, e.g., a glued joint.

Further, the display element 14 comprises a suspending element 48 in the form of an opening. Thereby, it is possible to hang up the display at a hook of a display stand or a sales board for the presentation in a shop.

What is claimed is:

1. A display for bicycle handlebar grips, comprising:
   a cardboard display element;
   a base element connected to said cardboard display element;
   a bicycle handlebar grip receiving element connected with said base element; and
   a bicycle handlebar grip positioned around said bicycle handlebar grip receiving element,
   wherein said bicycle handlebar grip receiving element lies parallel to said cardboard display element to form a grip opening therebetween so that said bicycle handlebar grip can be gripped by a user within said grip opening.

2. A display for bicycle handlebar grips, comprising:
   a planar display element;
   a base element connected to said planar display element;
   a bicycle handlebar grip receiving element connected with said base element; and
   a bicycle handlebar grip positioned around said bicycle handlebar grip receiving element,
   wherein said bicycle handlebar grip receiving element lies parallel to said planar display element to form a grip opening therebetween so that said bicycle handlebar grip can be gripped by a user within said grip opening, and
   wherein said bicycle handlebar grip receiving element comprises a stripping protection at an end facing away from said base element which substantially prevents said bicycle handlebar grip from being removed from said bicycle handlebar grip receiving element.

3. The display for bicycle handlebar grips according to claim 1, wherein said cardboard display element presents information connected thereto.

4. The display for bicycle handlebar grips according to claim 1, wherein said grip opening is pointing towards said bicycle handlebar grip receiving element.

5. The display for bicycle handlebar grips according to claim 1, wherein said cardboard display element is arranged above said bicycle handlebar grip receiving element.

6. A display for bicycle handlebar grips, comprising:
   a planar display element;
   a base element connected to said planar display element;
   a bicycle handlebar grip receiving element connected with said base element; and
   a bicycle handlebar grip positioned around said bicycle handlebar grip receiving element,
   wherein said bicycle handlebar grip receiving element lies parallel to said planar display element to form a grip opening therebetween so that said bicycle handlebar grip can be gripped by a user within said grip opening, and
   wherein said base element or said planar display element comprises a suspending element for reception at a display stand or a sales board.

7. A display for bicycle handlebar grips, comprising:
   a planar display element;
   a base element connected to said planar display element;
   a bicycle handlebar grip receiving element connected with said base element; and
   a bicycle handlebar grip positioned around said bicycle handlebar grip receiving element,
   wherein said bicycle handlebar grip receiving element lies parallel to said planar display element to form a grip opening therebetween so that said bicycle handlebar grip can be gripped by a user within said grip opening, and
   wherein said base element has a hollow space for receiving assembly instructions.

8. A display for bicycle handlebar grips, comprising:
   a planar display element;
   a base element connected to said planar display element;
   a bicycle handlebar grip receiving element connected with said base element;
   a bicycle handlebar grip positioned around said bicycle handlebar grip receiving element, wherein said bicycle handlebar grip receiving element lies parallel to said planar display element to form a grip opening therebetween so that said bicycle handlebar grip can be gripped by a user within said grip opening; and
   a second bicycle handlebar grip arranged in a packaging body connected with said planar display element.

9. A display for bicycle handlebar grips, comprising
   a rod-shaped receiving element;
   a first bicycle handlebar grip removably positioned on said rod-shaped receiving element;
   a display element having a bottom edge;
   a base element connecting said rod-shaped receiving element to said display element so that said rod-shaped receiving element lies parallel to said bottom edge and defines a grip opening between said bottom edge and said first bicycle handlebar grip; and
   a suspending opening in said display element, said suspending opening being sufficient to receive a hook of a display stand or a sales board so that said display element is suspendable from said hook.

10. The display for bicycle handlebar grips according to claim 9, wherein said display element comprises a planar display element.

11. The display for bicycle handlebar grips according to claim 9, wherein said bottom edge defines a half an ellipse or a half an oval.

12. The display for bicycle handlebar grips according to claim 9, wherein said base element defines a hollow space having assembly instructions therein.

13. The display for bicycle handlebar grips according to claim 9, further comprising a second bicycle handlebar grip secured to a front surface of said display element by a transparent packaging material.

14. The display for bicycle handlebar grips according to claim 13, further comprising a pair of locking elements for locking said first and second handlebar grips to handlebar ends, said pair of locking elements being secured to said front surface of said display element by said transparent packaging material.

15. The display for bicycle handlebar grips according to claim 9, wherein said display element, said base element and said rod-shaped receiving element are connected to one another such that said grip opening has a width along said bottom edge that is substantially the same as a width of said first bicycle handlebar grip.

16. A display for bicycle handlebar grips, comprising
a rod-shaped receiving element;
a first bicycle handlebar grip removably positioned on said rod-shaped receiving element;
a display element having a bottom edge;
a base element connecting said rod-shaped receiving element to said display element so that said rod-shaped receiving element lies parallel to said bottom edge and defines a grip opening between said bottom edge and said first bicycle handlebar grip; and
a suspending opening in said display element, said suspending opening being sufficient to receive a hook of a display stand or a sales board so that said base element is suspendable from said hook.

17. The display for bicycle handlebar grips according to claim 16, wherein said display element comprises a planar display element.

18. The display for bicycle handlebar grips according to claim 16, wherein said bottom edge defines a half an ellipse or a half an oval.

* * * * *